Figure 1:
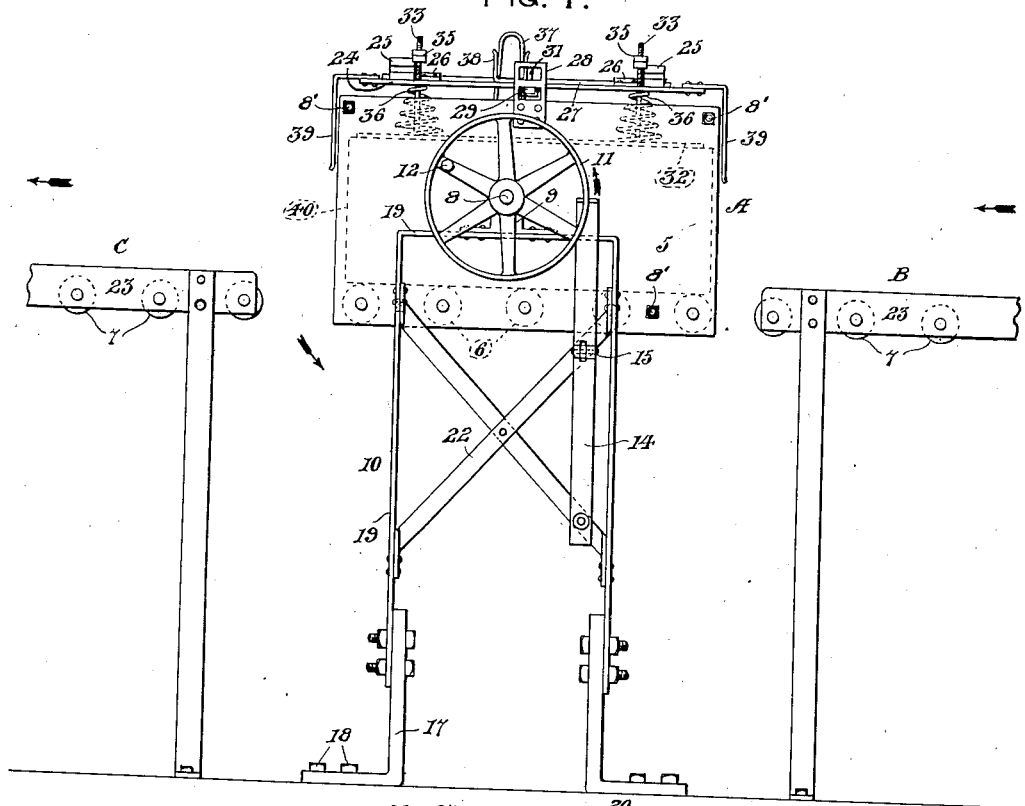

E. L. HANSELL.
LIQUID MIXING MACHINE.
APPLICATION FILED DEC. 31, 1920.

1,376,273.

Patented Apr. 26, 1921.
2 SHEETS—SHEET 1.

Inventor
Earl L. Hansell
By J. K. Bryant
Attorney

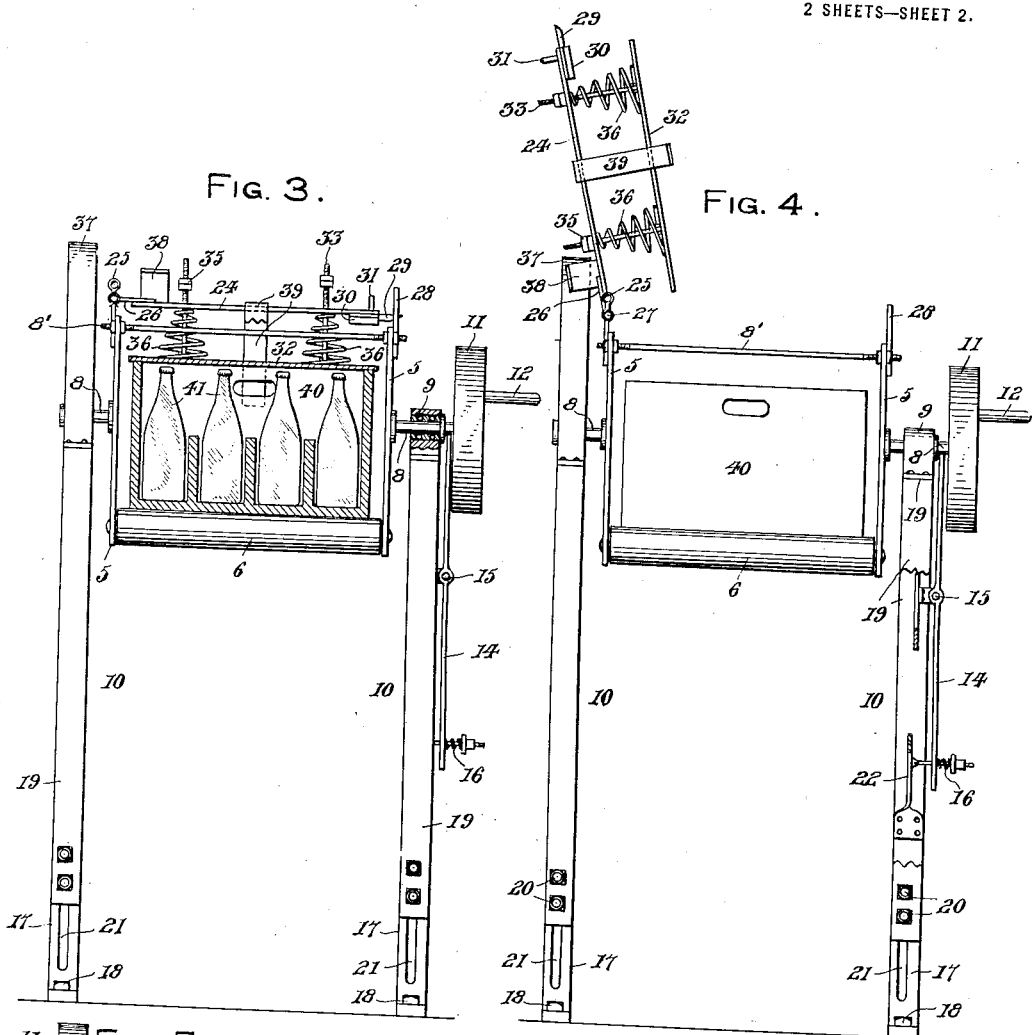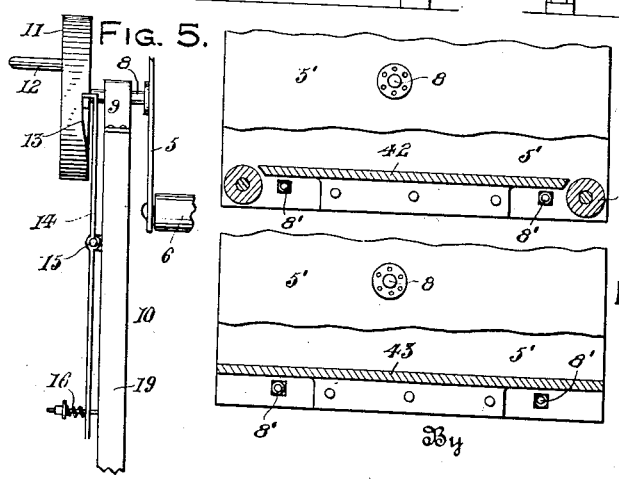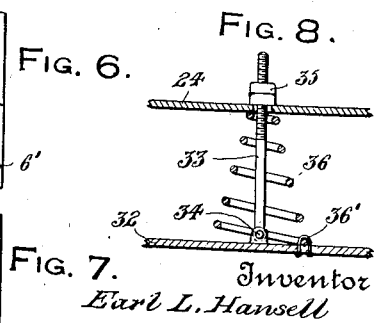

UNITED STATES PATENT OFFICE.

EARL L. HANSELL, OF PITTSBURGH, PENNSYLVANIA.

LIQUID-MIXING MACHINE.

1,376,273.  Specification of Letters Patent.  Patented Apr. 26, 1921.

Application filed December 31, 1920. Serial No. 434,343.

*To all whom it may concern:*

Be it known that I, EARL L. HANSELL, a citizen of the United States of America, residing at Pittsburgh, in the county of Allegheny and State of Pennsylvania, have invented certain new and useful Improvements in Liquid-Mixing Machines, of which the following is a specification.

This invention relates to certain new and useful improvements in liquid mixing machines particularly adapted for use in the soft drink industry in which it is common practice to place the various ingredients of the drinks within the bottles separately and subsequently mix the ingredients by inverting the filled bottles, one at a time, by hand.

The primary object of the present invention is to provide a device adapted to have crates or cases of filled bottles rapidly placed therein, and adapted to be rotated so as to invert the bottles for mixing the ingredients of the contents of the latter.

An important object of the invention is to provide a device of this kind which may be operated by a single attendant for receiving, in succession and one at a time, crates of bottles as rapidly as they are fed from the filling machine, for inverting the bottles twice so as to mix their contents, and for allowing removal of the crates to a desired point of discharge after the mixing operation, these acts being accomplished without hesitation in the feed of the cases of bottles, whereby a great deal of time and labor is saved that is wasted in the ordinary methods.

Another object is to provide an accessory for soft drink establishments including a rotatable mixing device a conveyer section or feed chute for facilitating feeding of crates of bottles from a filling machine to one end of said mixing device, the mixing device being constructed with open ends and provided with a bottom normally in the same plane as the conveyer section or chute whereby the crates may be readily run from the latter onto said bottom, quickly operable means being provided for holding the crate in the mixing device while it is rotated, and a second conveyer section or delivery chute leading from the other end of the mixing device and arranged in the same plane as the bottom of the latter whereby the crates may be readily shoved out of the mixing device onto the second conveyer section or chute for delivering the crates to a desired point of discharge.

Still another object is to provide a device of this kind which will be comparatively simple in its construction, which will be to a great degree, automatic in action, which will not break the bottles, and which will be highly efficient and durable in service, insuring thorough mixing of the ingredients of the drinks in the bottles.

With the above general objects in view, and others that will become apparent as the nature of the invention is better understood, the invention consists in the novel form, combination and arrangement of parts hereinafter more fully described, shown in the accompanying drawings and set forth in the appended claims.

Figure 2:
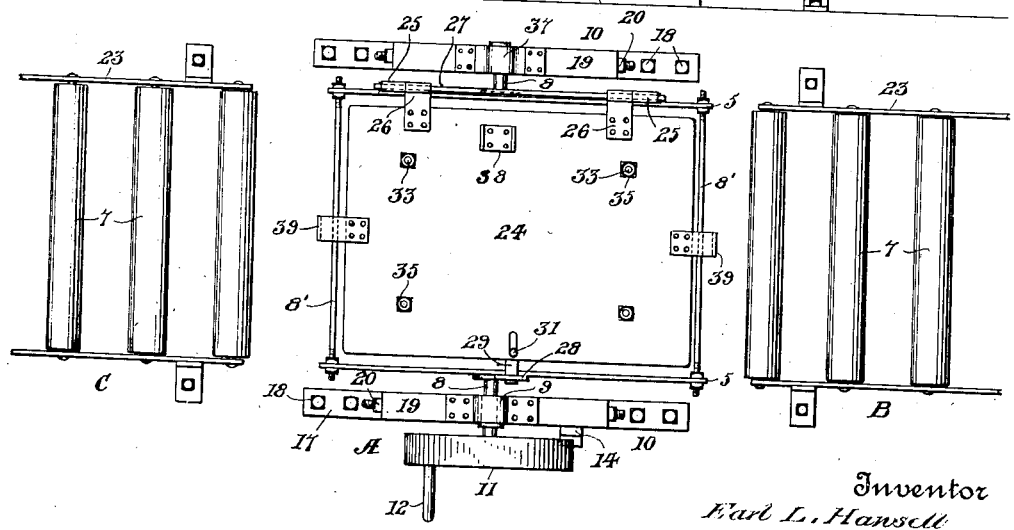

In the drawings, wherein like reference characters indicate corresponding parts throughout the several views, Figure 1 is a side elevational view, partly broken away, of the preferred form of drink mixing machine constructed in accordance with the present invention, Fig. 2 is a top plan view of the device shown in Fig. 1, Fig. 3 is a view, partly in end elevation, and partly in section of the mixing device *per se* shown in Fig. 1, the lids of the latter being closed and engaging a case of bottles shown in section, Fig. 4 is a view somewhat similar to Fig. 3, but with the lids open and other parts broken away to illustrate details of construction, Fig. 5 is a fragmentary elevational view illustrating the stop mechanism for automatically insuring the coming of the rotatable member of the mixing device to rest with the bottom of the latter alined with the conveyer sections or chutes, Fig. 6 is a fragmentary view in longitudinal section, showing a modified form of bottom for the rotatable member or receptacle of the device, Fig. 7 is a view similar to Fig. 6 of a further modification, and Fig. 8 is an enlarged fragmentary sectional view of the main and false covers or lids of the case receptacle and one of the adjustable cushioning spring-devices for the false cover.

Referring more in detail to the several views, the present invention includes a rotatable mixing device A, a conveyer section or feed chute B for facilitating feeding of crates or cases of bottles from a filling machine to the mixing device A, and a second conveyer section or delivery chute C leading from the mixing device, whereby the cases of bottles may be readily transported to a desired point of discharge.

The mixing device A includes a receptacle 5 formed with sides and a bottom and having open ends, the conveyer section B leading to one of said ends and the conveyer section C leading from the other end. In the form of the invention shown in Fig. 1, the bottom of the receptacle 5 is composed of a plurality of rollers 6 arranged, when the receptacle 5 is in the normal position thereof as shown in Fig. 1, in the same plane as the rollers 7 of the conveyer sections B and C. The receptacle 5 is preferably made of sheet material with the sides rigidly connected and braced by transverse rods or bolts 8', and this receptacle is rotatably mounted by means of stub shafts 8 rigid with and projecting from the sides of the receptacle and journaled in ball bearings 9 provided on the upper ends of supporting frames 10. The stub shafts 8 are placed nearer the delivery end of the receptacle 5 than the inlet end thereof so that there is a normal tendency for the receptacle to rotate backward.

A crank wheel 11 is fastened upon the projecting end of one of the stub shafts 8 and it is provided with a handle 12 to be grasped by the hand of the attendant for rotating the receptacle 5, and an edge of the rim of the wheel 11 is provided with a ratchet notch 13 arranged to coöperate with a pivoted pawl 14 for limiting the backward tilting movement of the receptacle 5 to a position wherein the bottom of the receptacle is lowermost and alined with the conveyer sections or chutes B and C. On the other hand, this ratchet mechanism will permit unobstructed rotation of the receptacle in an opposite direction or to the left of Fig. 1 for mixing the drinks in a manner which will presently become apparent. The pawl 14 is centrally pivoted as at 15 to the adjacent supporting frame 10, and the lower end of this pawl is spring pressed as at 16 so as to normally swing the upper end of the pawl outwardly into the notch 13.

Each supporting frame 10 comprises a pair of feet 17 preferably formed of bar iron and bent so as to have one portion extend vertically and its other portion horizontally for being bolted as at 18 to the floor. Each frame is provided with an upper vertically adjustable section 19 also preferably formed of bar iron so as to have a substantially inverted U-shape with the bearing 9 mounted upon the central horizontal portion thereof, and with the lower ends of the leg portions thereof slidably bolted to the vertical portions of the feet 17 by means of bolts 20 extending through perforations in the member 19 and through longitudinal elongated slots 21 in said vertical portions of the feet 17. In this way, the receptacle may be adjusted so as to insure accurate placement of the rollers 6 in the desired horizontal plane with respect to the rollers 7, whereby the crates of bottles may be most expeditiously fed from the conveyer section B to the mixing device A, and from the latter to the conveyer section C.

The frames 10 also each include crossed braces 22 provided for the members 19 thereof so that the latter may be constructed of thinner material than the feet 17 without sacrificing rigidity.

As shown, the bottom of the mixing device A is substantially a section of a conveyer when the receptacle is normally disposed, so that a substantially complete conveyer is provided by the same and the sections B and C adapted to extend from the bottling machine to a desired point of deposit. Obviously, the conveyer sections B and C may be of the roller type shown including side rails or guards 23 with the rollers 7 arranged therebetween, or they may be merely chutes or belt conveyer sections as the requirements of each individual case may dictate. This is also true with respect to the formation of the bottom of the receptacle 5.

A main cover or lid 24 is hinged to one side of the receptacle 5 by means of ears 25 rigid with said side and similar ears or hinged leaves 26 rigid with the cover 24, with a removable rod 27 passing through alined eyes of said leaves or ears 25 and 26. By providing the ears or leaves 25 with a plurality of superposed eyes or openings, the cover 24 may be adjustable vertically through removal of the rod 27 and reinsertion through other of these openings. The opposite side of the receptacle 5 is provided with a keeper plate 28 having superposed openings for automatic reception of the bolt 29 of a spring catch 30, the lowermost opening of the keeper plate 28 being employed when the cover is in its lower adjustment as shown in Fig. 3, and the upper opening of the plate 28 being adapted to receive the bolt 29 when the cover is in its upper adjusted position. This adjustment is made to accommodate varying sized cases as will be apparent. It will also be seen that the upwardly projecting handle 31 of the latch 30 may be readily manipulated for releasing the bolt 29 quickly whenever it is desired to swing the cover 24 backwardly to the position of Fig. 4, and when the cover is swung down to its closed position the bolt 29 will readily automatically snap into the proper opening of the keeper plate 28.

A second false closure or lid 32 is slidably connected to the main cover 24 by means of a plurality of bolts 33 each of which is preferably pivoted as at 34 to the false cover 32 and extends slidably through an opening in the cover 24, suitable nuts 35 being threaded upon the upper or outer ends of the bolts 33 so as to bear upon the outer face of said cover 24 for limiting the movement of the false cover 32 away from the lid 24. The limit of movement of the false cover 32 from the lid 24 may be adjusted by threading the nuts 35 onto or partially off of the bolts 33 to the desired extent, and these covers are normally yieldingly held in their spaced relation by helical springs 36 each of which surround one bolt 33 and which are arranged between said covers as clearly shown in Fig. 8. These springs may be held against lateral displacement by fastening the same as at 36'.

An inverted U-shaped strip of sheet metal indicated at 37 is bolted or otherwise fastened upon the horizontal portion of the rear frame 10, and the same is of such length as to extend upwardly to a point slightly above the hinges of the cover 24, and a U-shaped clip of resilient material is fastened as at 38 to the rear of the cover or lid 24 so as to engage and grip the sides of the strip or member 37 when said cover 24 is swung backwardly whereby the latter is stopped and releasably held in a slightly backwardly inclined position as shown in Fig. 4. Obviously, the false cover 32 will also move with the lid 24 to this position as shown, and, by reason of the clip 38 engaging the opposite sides of the strip or member 37, the receptacle 5 will be effectively held against tilting movements at such time.

In instances where the cases of bottles are rapidly fed to the mixing device, said cases may be fed partially through the discharged end of the receptacle 5, necessitating a return of the case to its proper position within the receptacle, and in order to guard against this, several of the rollers 6 may be covered with a sheet of tin for frictionally engaging the bottom of the case so as to act as a brake for preventing this movement of the case through the discharge end of the receptacle. In order to maintain the case properly positioned within the receptacle 5 when the covers 24 and 32 are closed, the cover 24 may be provided with depending end strips 39 arranged to engage the ends of the case 40 when said covers are closed as shown in Figs. 1 and 3. It will also be seen, that at the time the covers are closed, the false cover or lid 32 is pressed against the upper edges of the walls of the case 40 as shown in Fig. 3, by means of the springs 36. Thus, when the receptacle 5 is rotated, the bottles 41 within the case 40 are inverted so that they move, when upside down, against the false cover 32 to be supported by the latter. When this takes place, the false cover or lid 32 yields slightly so as to give a reciprocating movement to the bottles for thoroughly mixing the contents of the latter, although the bottles are prevented from such movement as would cause breakage of the same.

Referring to Fig. 6, wherein a modified form of the receptacle of the mixing device is shown, the receptacle includes a pair of sides connected by a transverse bottom member 42 terminating short of the open ends of the receptacle and with a roller 6' at each end of said bottom member. The receptacle in this form is broadly indicated as 5', and the provision of the flat bottom member 42 between the rollers 6' insures proper stopping of the case within the receptacle although facilitating movement of the same into and out of the receptacle. This bottom member 42 is preferably formed of sheet metal, although other material may be used.

Referring to Fig. 7, wherein a further modification of the receptacle is shown, the receptacle is also indicated at 5' and is provided with a complete flat bottom 43 preferably of sheet metal and employed in lieu of the rollers for positively insuring stopping of the crates within the receptacle where the crates are moved into the receptacle with considerable speed as found necessary when a large number of the same are to be rapidly handled.

In operation, the cover 24 together with the false cover 32, is swung backwardly to the position of Fig. 4 so that the clip 38 engages the U-shaped strip 37 for holding the receptacle in its normal position with its bottom horizontally disposed substantially in the plane of the conveyer or the chute sections B and C, the backward tilting movement of the receptacle 5 being positively prevented by the stop 14 engaging the shoulder of the notch 13. The case 40 is fed from the filling machine on the chute or conveyer section B into the adjacent open end of the receptacle 5, whereupon the operator swings the cover 24 downwardly so that the bolt 29 of the latch 30 automatically snaps into its proper opening in the keeper plate 28 for holding the cover 24 closed with the false lid 32 engaging the upper edge of the case 40 as shown in Fig. 3. The handle 12 is gripped for rotating the receptacle toward the left of Fig. 1 as indicated by the arrow, movement in this direction being permitted by riding of the pawl 14 along the inclined face of the notch portion of the wheel 11. Two revolutions are preferably imparted to the receptacle 5 in this manner for thoroughly mixing the ingredients of the contents of the bottles 41, and the receptacle 5 will automatically settle or return to its normal position of Fig. 1 where it is retained by the pawl 14 against its natural backward tilting tendency. The handle 31 is then quickly pushed rearwardly for releasing the bolt 29, and then the covers are quickly swung to their open position of Fig. 4, whereupon the case may be quickly shoved onto the conveyer section C for transportation to a desired point of discharge. This operation may be completed within a very short interval of time with the necessity of a minimum amount of labor expenditure, and the thorough mixing of the ingredients is insured by reason of the jiggering or reciprocating movement of the bottles as allowed by the yieldable lid 32.

It is believed that the construction and operation as well as the many advantages of the present invention will be readily understood and appreciated by those skilled in the art from the foregoing description.

Minor changes may be made in the form, combination and arrangement of parts without departing from the spirit and scope of the invention, as claimed.

It is to be understood that the term "drink mixing device", or similar terms employed in the specification and claims, are not intended to restrict the invention to the mixing of drinks, as it is obvious that the invention is susceptible of general application for the mixing of ingredients of various compounds, mixtures and the like.

What is claimed as new is:—

1. A liquid mixing machine including a rotatable mixing device, means to facilitate feeding of crates of bottles from a filling machine to one end of said mixing device, the mixing device being constructed with open ends and provided with a bottom normally in the same plane as said means, whereby the crates may be readily fed from the latter onto said bottom, quickly operable means for releasably holding the crate in the mixing device while it is rotated, and means at the other end of the mixing device and arranged in substantially the same plane as the bottom of the latter, for permitting the crates to be readily moved out of the mixing device onto the same and for delivering the crates to a desired point of discharge.

2. In combination with a pair of alined conveyer or chute sections, one leading from a source of supply of crates of filled bottles, and the other leading to a desired point of discharge, a rotatable mixing device interposed between said conveyer or chute section and having a bottom forming an intermediate section of the chute or conveyer, means to automatically bring and retain the mixing device at rest with its bottom alined with said first named conveyer or chute sections, and means for rotating said mixing device.

3. In combination with a pair of conveyer or chute sections, one leading from a source of supply of crates of filled bottles, and the other leading to a desired point of discharge, a rotatable mixing device interposed between said conveyer or chute sections and having a bottom forming an intermediate section of the chute or conveyer, means for mounting said mixing device so as to automatically bring and retain the same at rest with its bottom alined with said first named conveyer or chute sections, and means for rotating said mixing device, said mixing device including an open ended receptacle with one end arranged coincident with the adjacent end of each of said first named conveyer sections.

4. In combination with a pair of conveyer or chute sections, one leading from a source of supply of crates of filled bottles, and the other leading to a desired point of discharge, a rotatable mixing device interposed between said conveyer or chute sections and having a bottom forming an intermediate section of the chute or conveyer, means for mounting said mixing device so as to automatically bring and retain the same at rest with its bottom alined with said first named conveyer or chute sections, means for rotating said mixing device, said mixing device including an open ended receptacle with one end arranged coincident with the adjacent end of each of said first named conveyer sections, readily releasable means including a cover yieldably retaining a case of bottles within said receptacle, and means including a clip carried by said cover to maintain the receptacle against tilting movements in either direction when the receptacle is normally disposed and with the cover opened.

5. In a liquid mixing machine, a rotatable receptacle having open ends and provided with a hinged lid, means to retain said lid closed, a false cover yieldably held in spaced relation to the lid and adapted to yieldingly engage the upper edges of a crate of bottles when the latter is disposed upon the bottom of said receptacle, and means to rotate said receptacle.

6. In combination with a pair of spaced alined conveyer or chute sections, a drink mixing device including an open ended receptacle rotatably mounted on an axis transverse to the longitudinal axes of said chute or conveyer sections and interposed between the latter, said receptacle having a bottom normally disposed in substantially the same plane as said conveyer or chute sections, and means to rotate said receptacle.

7. In combination with a pair of spaced alined conveyer or chute sections, a drink mixing device including an open ended receptacle rotatably mounted on an axis transverse to the longitudinal axes of said chute or conveyer sections and interposed between the latter, said receptacle having a bottom normally disposed in substantially the same plane as said conveyer or chute sections, and means to rotate said receptacle, the bottom of said receptacle comprising an intermediate conveyer or chute section.

8. In combination with a pair of spaced conveyer or chute sections, a drink mixing device including a receptacle rotatably mounted on an axis transverse to the longitudinal axes of said chute or conveyer sections and interposed between the latter, said receptacle having a bottom normally disposed in substantially the same plane as said conveyer or chute sections, means to rotate said receptacle, said means for rotating said receptacle including a wheel provided with a ratchet notch, and a spring pressed stop associated with the notch of said wheel so as to permit free rotation of the receptacle in one direction and to prevent rotation of the same in the opposite direction when the bottom of the receptacle is horizontally disposed, and means to cause the receptacle to normally tend to rotate backwardly until arrested by said stop.

9. In combination with a feed chute or conveyer section rigidly mounted at a suitable elevation in a suitable horizontal position, and a delivery chute or conveyer section similarly mounted with the ends of said sections in spaced relation, an open ended receptacle arranged between said sections and rotatably mounted on an axis transverse to the longitudinal axes of said sections with the axis of rotation of the receptacle nearer one end of the same than the other whereby the receptacle normally tends to rotate backwardly, means to arrest the backward rotation of said receptacle when its bottom is substantially horizontally disposed, means to vertically adjust said receptacle so as to bring the bottom of the same in a desired horizontal plane relative to the horizontal plane of said conveyer or chute sections, and means to forwardly rotate said receptacle.

10. In combination with a feed chute or conveyer section rigidly mounted at a suitable elevation in a suitable horizontal position, and a delivery chute or conveyer section similarly mounted with the ends of said sections in spaced relation, an open ended receptacle arranged between said sections and rotatably mounted on an axis transverse to the longitudinal axes of said sections with the axis of rotation of the receptacle nearer one end of the same than the other whereby the receptacle normally tends to rotate backwardly, means to arrest the backward rotation of said receptacle when its bottom is substantially horizontally disposed, means to vertically adjust said receptacle so as to bring the bottom of the same in a desired horizontal plane relative to the horizontal plane of said conveyer or chute sections, means to forwardly rotate said receptacle, means including a hinged lid for yieldably maintaining a crate of bottles within said receptacle, and means to automatically retain the receptacle against tilting movement or rotation in either direction when the bottom of the receptacle is horizontally disposed and the lid is open.

11. In combination with a feed chute or conveyer section rigidly mounted at a suitable elevation in a suitable horizontal position, and a delivery chute or conveyer section similarly mounted with the ends of said sections in spaced relation, an open ended receptacle arranged between said sections and rotatably mounted on an axis transverse to the longitudinal axes of said sections with the axis of rotation of the receptacle nearer one end of the same than the other whereby the receptacle normally tends to rotate backwardly, means to arrest the backward rotation of said receptacle when its bottom is substantially horizontally disposed, means to vertically adjust said receptacle so as to bring the bottom of the same in a desired horizontal plane relative to the horizontal plane of said conveyer or chute sections, means to forwardly rotate said receptacle, means including a hinged lid for yieldably maintaining a crate of bottles within said receptacle, and means to automatically retain the receptacle against tilting movement or rotation in either direction when the bottom of the receptacle is horizontally disposed and the lid is open, said last named means being automatically releasable upon closing of said lid.

12. In combination with a pair of spaced alined feed and delivery conveyer or chute sections, a rotatable mixing device arranged between said sections and including a receptacle having open ends in proximity to which said chute or conveyer sections extend, said receptacle having a bottom, and means to automatically aline said bottom with said conveyer or chute sections for permitting cases of bottles to be readily moved into and out of the same from and to the feed and delivery sections respectively.

13. In combination with a pair of spaced alined conveyer or chute sections, a drink mixing device including an open ended receptacle rotatably mounted between said conveyer or chute sections, and having a bottom and means to aline the bottom of said receptacle with said conveyer or chute sections.

14. In combination with a pair of spaced conveyer or chute sections, a drink mixing device including an open ended receptacle rotatably mounted between said conveyer or chute sections, and means to automatically bring the receptacle at rest with its open ends registering with said conveyer or chute sections.

15. In combination with a pair of spaced conveyer or chute sections, a drink mixing device including an open ended receptacle rotatably mounted between said conveyer or chute sections, means to register the open ends of said receptacle with said conveyer or chute sections, said receptacle being constructed for reception of a crate of bottles, and means to releasably maintain the crate of bottles within the receptacle when it is rotated.

16. In combination with a pair of spaced conveyer or chute sections, a drink mixing device including an open ended receptacle rotatably mounted between said conveyer or chute sections, means to register the open ends of said receptacle with said conveyer or chute sections, said receptacle being constructed for reception of a crate of bottles, means to releasably maintain the crate of bottles within the receptacle when it is rotated, said last named means including a cover for the receptacle having depending end members for preventing undue endwise movement of the crate, and the cover being hinged for moving said end members out of the path of the crate when said cover is opened.

17. In a liquid mixing machine, a rotatable receptacle, means to rotate said receptacle, a wheel rotatable with said receptacle and provided with a ratchet notch, a spring pressed stop associated with the notch of said wheel so as to permit free rotation of the receptacle in one direction and to prevent rotation of the same in the opposite direction when the bottom of the receptacle is horizontally disposed, and means to cause the receptacle to normally tend to rotate backwardly until arrested by said stop.

18. In a liquid mixing machine, a rotatable receptacle with its axis of rotation nearer one end of the same than the other whereby the receptacle normally tends to rotate backwardly, means to automatically arrest the backward rotation of said receptacle when its bottom is substantially horizontally disposed and to permit free rotation of the receptacle forwardly, and means to forwardly rotate said receptacle.

19. In a liquid mixing machine, a rotatable receptacle provided with a hinged lid, means to rotate said receptacle, and means associated with the lid automatically operable upon opening of said lid when the bottom of the receptacle is substantially horizontally disposed to retain said receptacle against tilting movement or rotation in either direction.

20. In a liquid mixing machine, a rotatable receptacle provided with a hinged lid, means to rotate said receptacle, and means associated with the lid automatically operable upon opening of said lid when the bottom of the receptacle is substantially horizontally disposed to retain said receptacle against tilting movement or rotation in either direction, said last named means being automatically releasable by closing of said lid.

21. In a liquid mixing machine, a rotatable receptacle provided with a hinged lid, means to rotate said receptacle, means automatically operable upon opening of said lid when the bottom of the receptacle is substantially horizontally disposed to retain said receptacle against tilting movement or rotation in either direction, said last named means being automatically releasable upon closing of said lid, and including a clip carried by said lid, a support, and an upstanding member fixed to the support and arranged to be engaged by said clip when the cover is open.

22. In a liquid mixing machine, a rotatable receptacle having open ends and provided with a hinged lid, means to rotate said receptacle, and depending strips carried by the ends of said lid arranged to engage the ends of a case within the receptacle for preventing undue movement of the case when the receptacle is rotated.

23. In a liquid mixing machine, a rotatable receptacle having open ends and provided with a hinged lid, means to rotate said receptacle, said lid being provided with depending end members for preventing undue endwise movements of a crate within said receptacle, and the cover being hinged for moving said end members out of the path of the crate when said cover is opened.

24. In a liquid mixing machine, a rotatable receptacle having open ends and provided with a hinged lid, means to retain said lid closed, a false cover attached to and yieldingly held in spaced relation to the lid and adapted to engage a crate of bottles when the latter is disposed upon the bottom of said receptacle and the lid is closed, and means to simultaneously vertically adjust the lid and the false cover relative to the bottom of the receptacle, the means for retaining the lid closed being constructed to function when the lid is in any of its vertically adjusted positions.

25. In a liquid mixing machine, a rotatable receptacle having open ends, hinge leaves rigid with one side of said receptacle and provided with a plurality of superposed eyes or openings, a lid having hinge leaves rigid therewith, the last named hinge leaves being provided with eyes or openings adapted to be selectively alined with ones of the superposed eyes or openings of the first named leaves for positioning the lid at different distances from the bottom of the receptacle, and removable means for connecting the leaves of the receptacle and the lid whereby the lid is hingedly mounted for vertical swinging movement a desired distance above the bottom of the receptacle, a keeper plate fixed to the opposite side of the receptacle and having superposed openings, and a spring catch arranged for automatic reception within the desired opening of the keeper plate when the lid is closed.

26. In a liquid mixing machine, a rotatable receptacle having open ends and provided with a lid, a false cover adapted to engage the upper edges of a bottle crate when the latter is disposed upon the bottom of said receptacle, means attaching said false cover to the lid operable to adjust the false cover toward the crate for clamping the latter between the false cover and the bottom of the receptacle, and means to rotate said receptacle, said false cover serving to retain bottles within the crate when the receptacle is rotated.

27. In a liquid mixing machine, a rotatable receptacle having open ends and provided with a lid, a false cover adapted to engage the upper edges of a bottle crate when the latter is disposed upon the bottom of said receptacle, means attaching said false cover to the lid operable to adjust the false cover toward the crate for clamping the latter between the false cover and the bottom of the receptacle, means to rotate said receptacle, said false cover serving to retain bottles within the crate when the receptacle is rotated, means to facilitate feeding of crates of bottles to one open end of said receptacle, and means to deliver the crates from the other open end of the receptacle to a desired point of discharge.

In testimony whereof I affix my signature.

EARL L. HANSELL.

Witnesses:
HERMAN W. KLEIN,
G. H. OLNHAUSEN.